US009880020B1

(12) United States Patent
Emigh

(10) Patent No.: US 9,880,020 B1
(45) Date of Patent: *Jan. 30, 2018

(54) DYNAMIC ROUTE UPDATING FOR REFUELING BASED ON ROUTE DEVIATION METRICS

(71) Applicant: Aaron Emigh, Incline Village, NV (US)

(72) Inventor: Aaron Emigh, Incline Village, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/679,043

(22) Filed: Apr. 6, 2015

Related U.S. Application Data

(63) Continuation of application No. 12/839,388, filed on Jul. 19, 2010, now Pat. No. 9,002,632.

(60) Provisional application No. 61/226,742, filed on Jul. 19, 2009.

(51) Int. Cl.
*G01C 21/34* (2006.01)
*G01C 21/36* (2006.01)

(52) U.S. Cl.
CPC ......... *G01C 21/3697* (2013.01); *G01C 21/34* (2013.01); *G01C 21/3446* (2013.01); *G01C 21/36* (2013.01)

(58) Field of Classification Search
CPC .... G01C 21/3697; G01C 21/34; G01C 21/36; G01C 21/3446; G01C 21/3469
See application file for complete search history.

(56) References Cited

U.S. PATENT DOCUMENTS

| 5,974,356 | A * | 10/1999 | Doyle | G01C 21/28 342/357.3 |
| 6,078,850 | A * | 6/2000 | Kane | B60S 5/02 340/439 |
| 6,519,527 | B2 * | 2/2003 | Shinagawa | G01C 21/20 701/3 |
| 7,729,998 | B2 * | 6/2010 | Dickman | G06Q 10/083 701/123 |

(Continued)

FOREIGN PATENT DOCUMENTS

| CA | 2385952 A1 * | 11/2002 | B60K 6/365 |
| DE | 102005016006 A1 * | 10/2006 | G01C 21/3469 |

(Continued)

OTHER PUBLICATIONS

Ferhat et al., "Navigation and guidance planning for air vehicles," Year: 2008, vol. 2, pp. 534-538.*

*Primary Examiner* — Tuan C To

(57) ABSTRACT

In some embodiments, techniques for trip routing include determining a set of refueling stations, each of which is less than a threshold distance of deviation from a route; determining a fuel price and a deviation cost for each of the set of refueling stations, wherein the deviation cost is based on a unit distance of deviation from the route for each respective refueling station; calculating an imputed cost for each of the set of refueling stations, wherein the imputed cost is based on a combination of the fuel price and the corresponding deviation cost at each respective refueling station; selecting a first refueling station from among the set of refueling stations, wherein the first refueling station has a minimum imputed cost; updating the route to include the first refueling station; and presenting information relating to the updated route.

20 Claims, 4 Drawing Sheets

(56) References Cited

U.S. PATENT DOCUMENTS

| | | | | |
|---|---|---|---|---|
| 7,920,962 B2* | 4/2011 | D'Andrea | ........ | G05B 19/41895 |
| | | | | 700/245 |
| 2005/0107951 A1* | 5/2005 | Brulle-Drews | .... | G01C 21/3461 |
| | | | | 701/533 |
| 2006/0218056 A1* | 9/2006 | Dickman | ............ | G06Q 10/083 |
| | | | | 705/28 |
| 2008/0167812 A1* | 7/2008 | Geelen | ............... | G01C 21/3641 |
| | | | | 701/469 |
| 2009/0157289 A1* | 6/2009 | Graessley | ................ | B60L 3/12 |
| | | | | 701/123 |
| 2009/0187416 A1* | 7/2009 | Baer | ........................ | B60S 5/02 |
| | | | | 705/1.1 |
| 2009/0281717 A1* | 11/2009 | Nambata | ............ | G01C 21/3641 |
| | | | | 701/532 |
| 2010/0082230 A1* | 4/2010 | Hong | .................. | G01C 21/362 |
| | | | | 701/533 |
| 2010/0198508 A1* | 8/2010 | Tang | ................. | G01C 21/3469 |
| | | | | 701/414 |
| 2010/0235076 A1* | 9/2010 | Ofek | ................. | G01C 21/3469 |
| | | | | 701/123 |

FOREIGN PATENT DOCUMENTS

| | | | | |
|---|---|---|---|---|
| EP | 1505555 A1 * | 2/2005 | ......... | B60K 31/0008 |
| WO | WO-2008083742 A1 * | 7/2008 | ......... | G01C 21/3655 |

\* cited by examiner

DYNAMIC ROUTE UPDATING FOR REFUELING BASED ON ROUTE DEVIATION METRICS

CROSS REFERENCE TO RELATED APPLICATIONS

This application claims priority to co-pending U.S. Provisional patent application Ser. No. 12/839,388, entitled FUEL COST OPTIMIZED ROUTING, filed Jul. 19, 2010, which is incorporated herein by reference for all purposes, which claims priority to U.S. Provisional Patent Application No. 61/226,742, entitled INFORMATION PROCCESSING, filed Jul. 19, 2009, which is incorporated herein by reference for all purposes.

FIELD OF THE INVENTION

The present invention relates generally to the area of vehicular navigation. More specifically, techniques for planning a route based on fuel cost are disclosed.

BACKGROUND OF THE INVENTION

Fuel costs are rising and are an increasingly onerous expense in the operation of a vehicle such as a car. Route planners, such as route planning navigational systems (e.g. hand-held or vehicular), commonly optimize for distance or time, and further can in some cases provide information relating to where fuel (e.g. gasoline) may be available. Furthermore, gasoline prices are in some instances available online. However, route planners do not factor in fuel prices, or make recommendations to travelers based on such information. As a result, more is paid than is necessary.

Accordingly, it would be useful to have routes planned for reducing fuel costs as well as other factors.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a non-transitory computer readable storage medium (such as a magnetic storage medium, e.g. a disk, an electronic storage medium, e.g. a flash memory, or an optical storage medium, e.g. a CD-ROM or DVD-ROM) or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
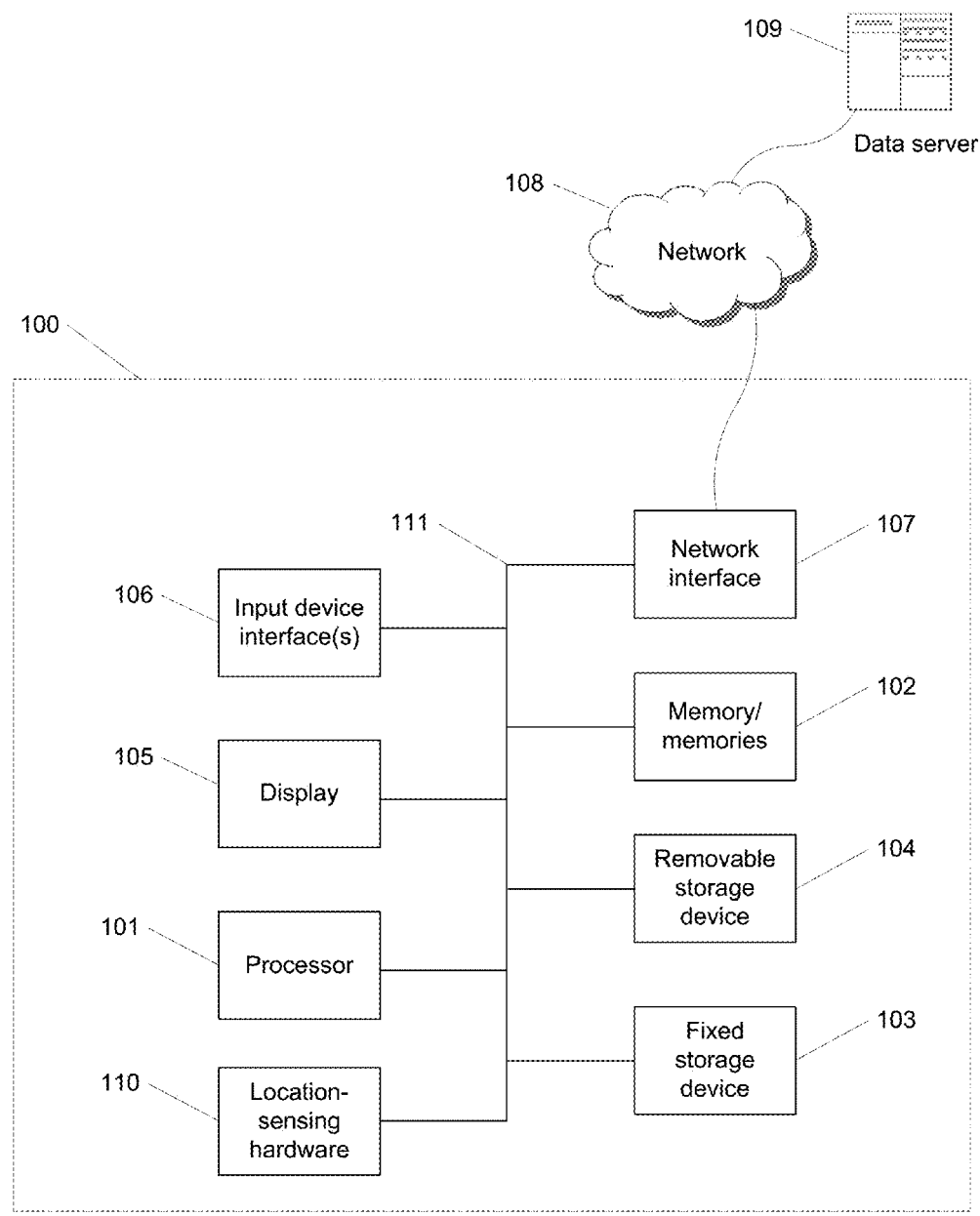
FIG. 1 is a diagram of a system for fuel cost optimized route planning, according to some embodiments.

FIG. 1 is a diagram of a system for fuel cost optimized route planning, according to some embodiments. As will be apparent, other computer system architectures and configurations can be used to plan routes. In this example, computing device 100, which may be any device that can plan routes, such as a computer, a location aware device such as a vehicular navigation device or a handheld navigation device, a smartphone, a tablet computer, etc., includes various subsystems as described below. It includes at least one microprocessor subsystem (also referred to as a processor or a central processing unit (CPU)) 101. In various embodiments, processor 101 may be implemented by a single-chip processor or by multiple processors. In some embodiments, processor 101 is a general purpose digital processor. Using instructions retrieved from one or more memories 102, processor 101 controls the reception and manipulation of input data, and the output and display of data on output devices (e.g., display 105). In some embodiments, processor 101 performs the client-side techniques described below in conjunction with the remaining Figures.

Processor 101 is coupled bi-directionally with a memory 102. Memory 102 may comprise multiple memories, and is referred to in the singular purely for expository simplicity. Memory 102 may include a first primary storage, typically a random access memory (RAM), and a second primary storage, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 101. Also as well known in the art, primary storage typically includes basic operating instructions, program code, data and objects used by the processor 101 to perform its functions (e.g., programmed instructions). In some embodiments, primary memory 102 may include any suitable computer-readable storage media, described below, depending on whether, for example, data access needs to be bidirectional or unidirectional. In some embodiments, processor 101 may also directly retrieve and store frequently needed data in one or more cache memories (not shown).

Fixed storage device 103 may provide data storage capacity for computing device 100, and is coupled either bidirectionally (read/write) or unidirectionally (read only) to processor 102. Examples of fixed storage device 103 include computer-readable media such as flash memory, a hard disk drive, an optical storage device such as a DVD-ROM, and other storage devices that retain their data when computing device 100 is powered off. Fixed storage device 103 may store additional programming instructions, data, and the like for processor 101, which may for example be loaded into memory 102 for use by processor 101 as needed. In some embodiments, a removable storage device 104, for example a flash memory card such as an SD card, a Micro SD card, or an SDHC card, provides additional data storage capacity. It will be appreciated that the information retained within storage devices 103, 104 can be incorporated, if needed, in standard fashion as part of memory 102 as virtual memory.

Display 105 may be any form of human-readable display, such as an LCD screen. Display 105 may display text and/or graphics as instructed by processor 101. In various embodiments, display 105 may be integrated with computing device 100, or may be separate and an interface between the two may be included in each respective component.

Input device interface(s) 106 provide interfaces, such as USB, through which user input may be received. Examples include a keyboard, a mouse, and a touchscreen.

Location sensing hardware 110 is connected, directly or indirectly, to processor 101. Location sensing hardware 110 may be any hardware that can determine a current location of itself and/or a vehicle in which it is embedded. Examples of location sensing hardware 110 include a GPS (Global Positioning System) satellite receiver, an accelerometer, a physical motion sensor such as a switch, micro switch, or magnetic reed switch, and/or a location receiving device such as a wirelessly networked device that receives information relating to a current location from transmitters, directly or indirectly.

Network interface 107 is hardware that provides access to network 108. In some embodiments, such as for wired networks, network interface 110 may include a plug, such as an Ethernet plug. In some embodiments, such as for wireless networks, network interface 107 may include an antenna.

Network 107 may be any type of network, for example a public network such as the internet or a cellular phone network such as a GPRS network. In another example, the network 107 may be an enterprise or home network, a virtual private network, or a wireless network such as an 802.11 or Bluetooth network. In some embodiments, the network 107 may include more than one network. An example of a network 107 including more than one network is a local area network connected to a public network such as the internet. An example of the use of such a network is for a computing device 100 to be connected via a local area network such as an enterprise network (for example via a wireless router), and for the local area network to be connected to email server 109 and/or web server 110 via a public network such as the internet.

Data server 109 is connected, directly or indirectly, to the network 107. Data server 109 provides data to computing device 100 via network 107, for example by TCP/IP, HTTP, and/or proprietary protocols. In various embodiments, data server 109 (which in some embodiments may encompass several physical servers and/or services) may provide data relating to maps, route planning, gas station locations, and/or gasoline pricing data relating to gasoline stations, as well as other data as needed.

Bus 111 may provide access between the various subsystems of computing device 100. Bus 111 is illustrative of any interconnection scheme serving to link the subsystems. Other computer architectures having different configurations of subsystems, and various other interconnection schemes, can also be utilized.

The techniques of the remaining figures can be run on the system of this FIG. 1, as described above.

Figure 2:
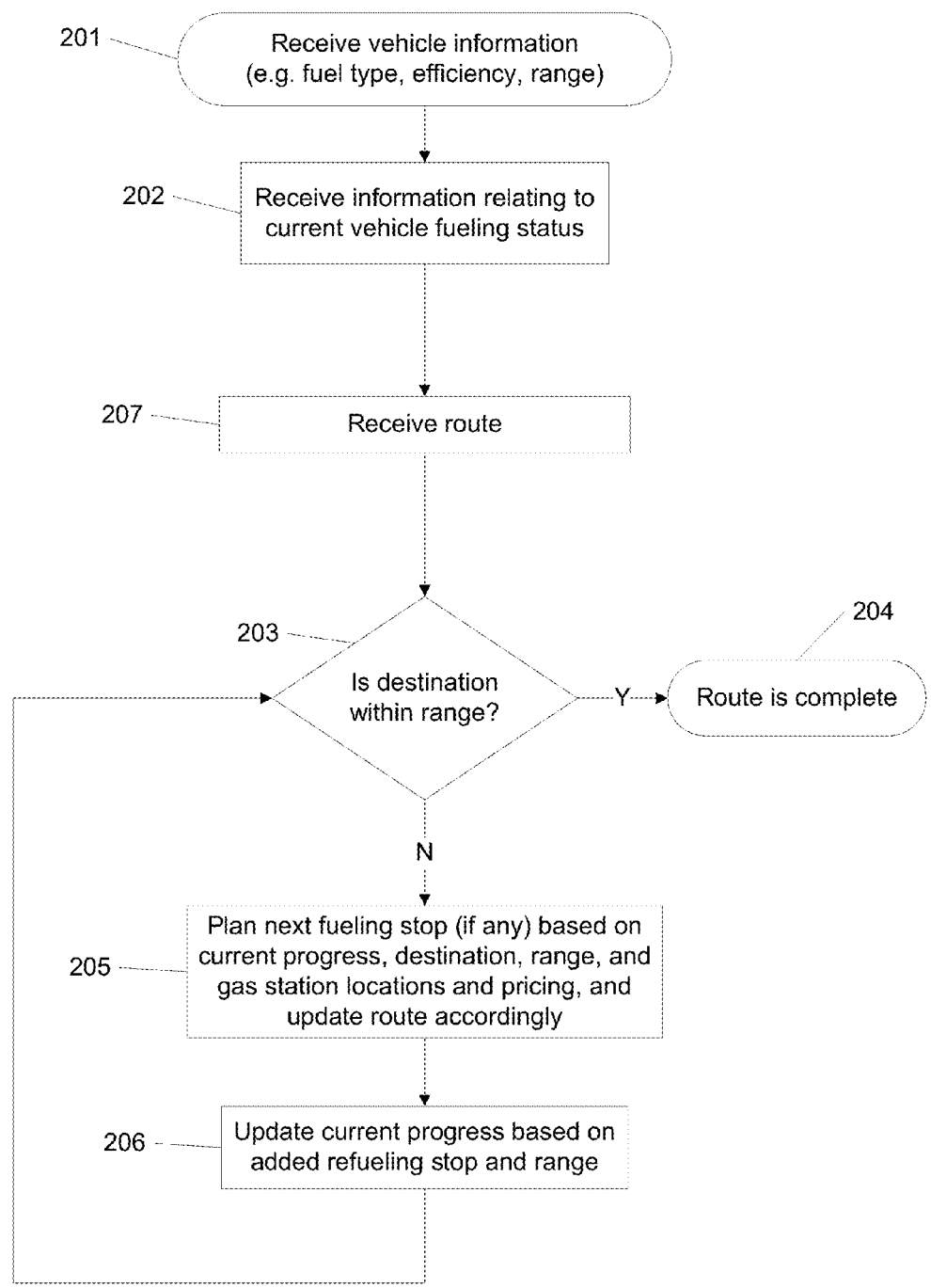
FIG. 2 is a flow diagram of a method for planning a route taking fuel availability and price into account, according to some embodiments.

FIG. 2 is a flow diagram of a method for planning a route taking fuel availability and price into account, according to some embodiments. In this example, vehicle information is received (201). Examples of vehicle information include information about the type of fuel (e.g. a fuel grade such as regular unleaded, super unleaded, diesel (which for the purposes of this application is considered to be a type of gasoline), etc.), the efficiency in terms of expected or nominal miles per gallon or kilometers per liter, the fuel capacity, and/or the range of the vehicle on a full tank of gas.

Information relating to the current vehicle fueling status may be received (202). An example of such information is the amount of fuel currently in the vehicle for which the route is being planned. In one example, such information may be input by the user, for example as a percentage of fullness of the tank. In another example, such information may be reported by the vehicle, either directly to the route planning hardware or via an intermediary device. For example, such information may be downloaded via a network, or from a computer, or a hand-held device (which may in some embodiments itself be a navigational system). In some embodiments, it may be assumed that the tank is full, or some percentage of full, such as 90%.

Information relating to a route may be received (207). One example of receiving information relating to a route is to receive a starting and ending point, and optionally information such as a preference for routing by highways or local roads, or by time or distance priority, etc. A route may then be calculated based on the received criteria. Another example of receiving information relating to a route is to receive an initial route, for example including start and end points and information about the prospective route to be taken between the two.

It may be determined if the destination (i.e. the end of the route) is within range (203). One example of being in range is that the distance along the route from the current point to the destination is less than the expected range. (In this example, the current point is initially the starting point of the route, and is updated as described below.) Another example of being in range is that the distance along the route from the current or starting point to the destination is less than the expected range is such that it is expected to be completed before a lower bound on fuel (such as the point at which a fuel light would turn on, or a quarter tank, or 50 miles) will be reached, for example based on extrapolating from expected fuel efficiency and supply.

If it is determined that the destination is within range (203), then in this example the route is deemed complete (204).

If it is not determined that the destination is within range (203), then in this example a next fueling stop may be planned based on factors such as the current point, destination, range, and gas station locations and pricing, and the route may be updated accordingly (205). Examples of this operation are discussed in conjunction with FIG. 3.

The current point may be set to the next refueling stop that has been planned (206), and it may be determined whether the addition of this refueling stop has placed the destination within range (203).

Figure 3:
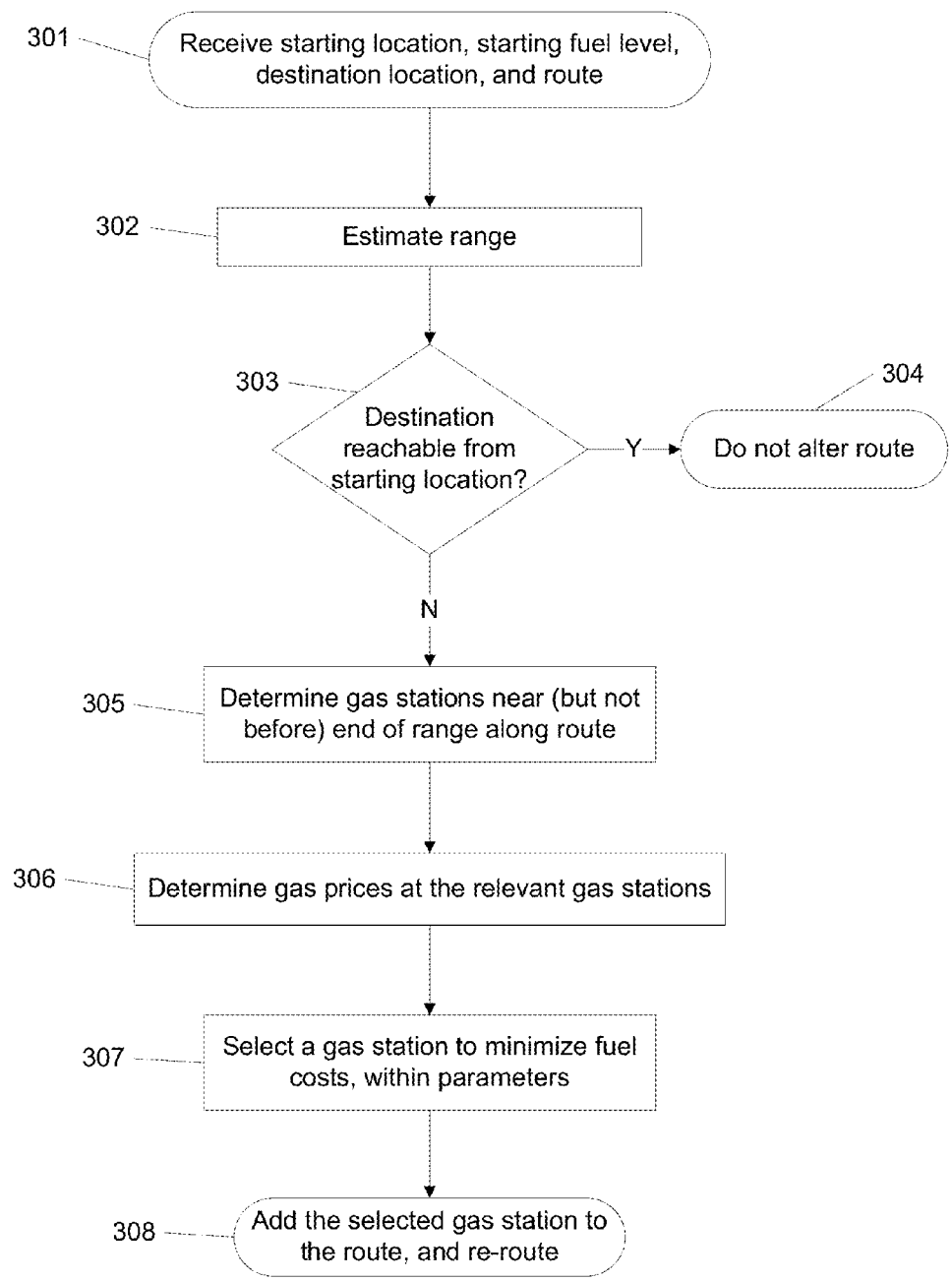
FIG. 3 is a flow diagram of a method for determining a next refueling stop, according to some embodiments.

FIG. 3 is a flow diagram of a method for determining a next refueling stop, according to some embodiments. In this example, information such as a starting location, a starting fuel level, a destination location, and a route is received (301), for example from a route planner, either pre-trip (for example as discussed in conjunction with 205 of FIG. 2) or in-trip (for example as discussed in conjunction with 406 of FIG. 4). A starting location, as used in conjunction with this FIG. 3, is not necessarily the start of an entire route, but may be the start of a particular sub-route (e.g. a current location per FIG. 4, or a refueling location/"current point" per FIG. 2).

A range may be estimated (302). An example of estimating a range is to calculate a distance along the route from the starting point to the destination that is expected to be completed before a lower bound on fuel (such as the point at which a fuel light would turn on, or a quarter tank, or 50 miles worth of fuel, or no fuel) will be reached, for example based on extrapolating from expected fuel efficiency and supply. In some embodiments, a classification of the roads along the route may also be factored into the estimation, for example by associating different efficiency factors with different roads or different types of roads (e.g. more efficient for highways, less efficient for cities and mountain passes—which in some embodiments may be different depending on the direction in which a road will be traveled) and multiplying a nominal efficiency by such efficiency factors for the length of each respective segment.

It may be determined whether the destination is reachable from the starting location (303), for example as discussed in conjunction with 203 of FIG. 2. If it is determined that the destination is reachable from the starting location (303), then in this example the route is not altered (304).

If it is not determined that the destination is reachable from the starting location (303), then in this example a set of gas stations near (but not beyond) the end of the estimated range along the route is determined (305). Such information may, for example, be determined by consulting a points-of-interest (POI) database, either online or using local data such as cached or permanently cached data, using the routing information, or from stored data received with the routing information. In some embodiments, gas stations within some threshold level of deviation from the route (such as one mile, or ten miles, or no deviation) may be included. In some embodiments, such a threshold level of deviation may be incrementally increased until some threshold number of gas stations are included, or until it hits a threshold (such as ten miles) with at least one gas station being included, whichever comes first.

Gas prices at the gas stations so determined may be determined (304). Such prices may, in various embodiments, be retrieved online, or from information stored (e.g. cached) locally, or received associated with the routing information. In some embodiments, pricing information for gas stations may be provided by approved vendors or one or more partners. In some embodiments, pricing information for gas stations may be provided by users. In such embodiments, a peer-to-peer reputation system, for example based on a number of ratings, an average rating, etc. may be used to ensure the quality of data. In some embodiments, older price information may be extrapolated, for example by multiplying the price by the average amount that the price has changed since the price was last known or reported, and adding that change (which may be positive or negative) to the last known or reported price.

A next gas station may be selected (307) that optimizes for fuel cost (e.g. by using the lowest-cost gas station available), or balances convenience with cost (e.g. by selecting a station close to the end of the range, and/or with a relatively small deviation from the route). For example, the cheapest gas stations requiring less than some threshold distance (for example one mile) of additional travel may be selected such that the gas tank is, or is projected to be, at most half full at the time the tank is filled, and no less than the lower threshold. In some embodiments, a balancing of cost and convenience may be achieved by associating each unit distance (such as a mile) of deviation with a cost, and minimizing the value of the expected refueling cost plus the deviation charge associated with each among the set of refueling stations. In some embodiments, a station may be automatically selected, without user involvement. In some embodiments, a candidate set of gas stations may be presented to the user, for example along with information relating to the brand, pricing, and deviation distance of each, and the user may make the selection.

The selected gas station may be added to the route (308), and the route may be recalculated, e.g. by considering the gas station to be a sub-destination and routing from the starting location to the gas station, and then from the gas station to the destination. The route so modified may be returned.

Figure 4:
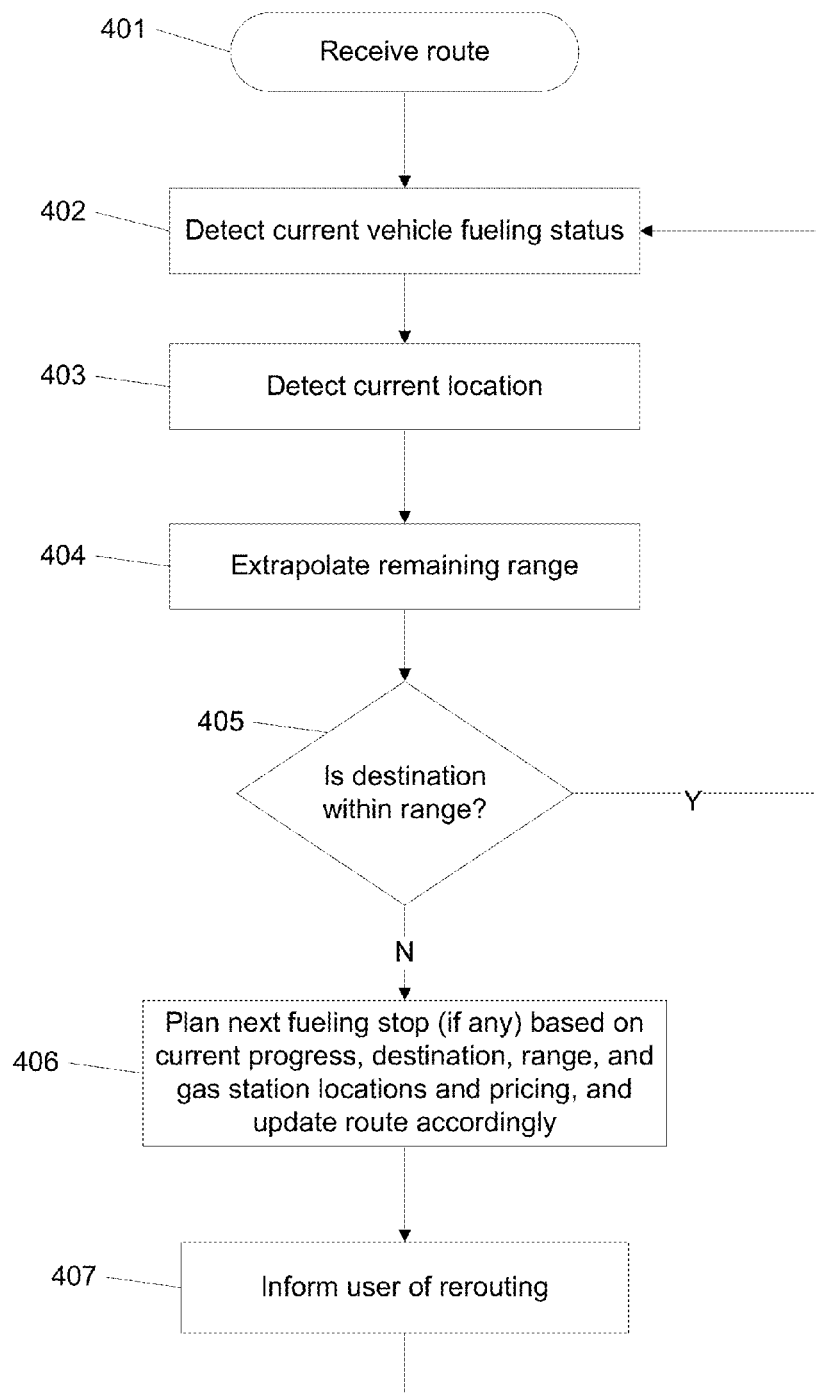
FIG. 4 is a flow diagram of a method for dynamically routing based on fuel pricing, current location, and current fuel status, according to some embodiments.

FIG. 4 is a flow diagram of a method for dynamically routing based on fuel pricing, current location, and current fuel status, according to some embodiments. In this example, a route is received (401), for example from a route planner (which in various embodiments may be an externally received route, or a route generated by a device such as an automotive navigation system at which this technique may be performed).

The current vehicle fueling status may be detected (402). For example, an electronic gas gauge may transmit a signal to processor 101 of FIG. 1 that contains an indication, such as a digital quantification or an alert that a threshold has been reached, of the fullness of the tank. In various embodiments, such a detection may be in response to a request, or may be an externally triggered event.

The current location may be detected (403), for example by receiving it from location-sensing hardware 110 of FIG. 1.

A remaining range for the vehicle may be estimated (404), for example as discussed in conjunction with 302 of FIG. 3.

If it is determined that the current level of fuel is extremely low at 402 (e.g. below a threshold such as the thresholds discussed in conjunction with 302 with respect to the end of a range), then in some embodiments a navigational system may determine that a gas station on or near the upcoming route is the last station at which fuel can be obtained if progress along the route continues without more than some threshold level of deviation from the route (such as one mile, or ten miles, or no deviation) before the fuel level is projected to drop below a lower fuel threshold as disclosed above. When this is detected, the user may be alerted and it may be recommended that gasoline be purchased at the station, and directions to the station may be provided, for example by interjecting them into the route at the appropriate place, with the route resuming after the station.

It may be determined whether the destination of the route is within range (405), for example as discussed in conjunction with 303 of FIG. 3. If it is determined that the destination of the route is within range (405), then in various embodiments the process of rerouting may be completed, or a vehicle fueling status may once again be determined (402), for example after a predetermined period of time has elapsed or in response to an event reporting a vehicle fueling status.

If it is not determined that the destination of the route is within range (405), then in this example a next fueling stop may be planned based on factors such as the current location, destination, range, and gas station locations and pricing, and the route may be updated accordingly (406). Examples of this operation are discussed in conjunction with FIG. 3.

If rerouting has occurred to a gas station, then in this example the user is informed of such rerouting (407), for example immediately, or when directions related to the rerouting would normally be presented (for example a predetermined distance or estimated time from a turn). Such presentation may include audible and/or displayed information, such as the fact that it is a gas stop, the reported price of gasoline at the stop, and/or the amount of deviation from the route.

It may be readily appreciated by those in the art that in addition to the specific techniques presented herein for pre-trip (e.g. as discussed in conjunction with FIG. 2) and in-trip (e.g. as discussed in conjunction with FIG. 4) fuel price sensitive route planning, other techniques may be applied, such as applying global optimization techniques known in the art.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for routing a trip, comprising:
   executing instructions on a hardware processor to determine a route, wherein the route includes a starting location and a destination location;
   determining a first candidate set of refueling stations accessible from the route, wherein each of the refueling stations within the first candidate set of refueling stations accessible from the route is less than a first threshold distance of deviation from the route;
   determining a fuel price associated with each of the first candidate set of refueling stations;
   calculating a deviation cost for each of the first candidate set of refueling stations accessible from the route, wherein the deviation cost is based on a unit distance of deviation from the route for each respective refueling station among the first candidate set of refueling stations accessible from the route;
   calculating an imputed cost for each of the first candidate set of refueling stations accessible from the route, wherein the imputed cost is based on a combination of the fuel price at each respective refueling station among the first candidate set of refueling stations accessible from the route and the corresponding deviation cost for each respective refueling station among the first candidate set of refueling stations accessible from the route;
   selecting a first refueling station from among the first candidate set of refueling stations, wherein the first refueling station has a minimum imputed cost of any refueling station among the first candidate set of refueling stations accessible from the route;
   executing instructions on the hardware processor to update the route to include the first refueling station; and
   presenting information relating to the updated route.

2. The method of claim 1, performed at a vehicular navigation system.

3. The method of claim 1, further comprising determining a current location, and using the current location as the first point.

4. The method of claim 1, wherein a fuel price associated with at least one of the refueling stations among the first candidate set of refueling stations is retrieved from an online source.

5. The method of claim 1, wherein a fuel price associated with at least one of the refueling stations among the first candidate set of refueling stations is provided by a user.

6. The method of claim 1, wherein a fuel price associated with at least one of the refueling stations among the first candidate set of refueling stations is provided by an approved vendor.

7. The method of claim 1, further comprising determining a second candidate set of refueling stations from among the first candidate set of refueling stations accessible from the route, presenting information relating to each refueling station among the second candidate set of refueling stations, and receiving a selection of the first refueling station from among the second candidate set of refueling stations.

8. The method of claim 7, wherein the second candidate set of refueling stations is the first candidate set of refueling stations accessible from the route.

9. The method of claim 7, wherein the information relating to each refueling station among the second candidate set of refueling stations includes a brand, pricing, and a deviation distance.

10. The method of claim 1, wherein the combination of the fuel price at each respective refueling station among the first candidate set of refueling stations accessible from the route and the corresponding deviation cost for each respective refueling station among the first candidate set of refueling stations accessible from the route includes adding the expected refueling cost at each respective refueling station among the first candidate set of refueling stations accessible from the route and the corresponding deviation cost for each respective refueling station among the first candidate set of refueling stations accessible from the route.

11. The method of claim 1, wherein updating the route to include the first refueling station includes routing from the starting location to the first refueling station and from the first refueling station to the destination location.

12. A system for routing a trip, comprising:
    a processor configured to:
      determine a route, wherein the route includes a starting location and a destination location;
      determine a first candidate set of refueling stations accessible from the route, wherein each of the refueling stations within the first candidate set of refueling stations accessible from the route is less than a first threshold distance of deviation from the route;
      determine a fuel price associated with each of the first candidate set of refueling stations;
      calculate a deviation cost for each of the first candidate set of refueling stations accessible from the route, wherein the deviation cost is based on a unit distance of deviation from the route for each respective refueling station among the first candidate set of refueling stations accessible from the route;
      calculate an imputed cost for each of the first candidate set of refueling stations accessible from the route, wherein the imputed cost is based on a combination of the fuel price at each respective refueling station among the first candidate set of refueling stations accessible from the route and the corresponding deviation cost for each respective refueling station among the first candidate set of refueling stations accessible from the route;

select a first refueling station from among the first candidate set of refueling stations, wherein the first refueling station has a minimum imputed cost of any refueling station among the first candidate set of refueling stations accessible from the route;

update the route to include the first refueling station; and present information relating to the updated route; and a memory coupled with the processor, wherein the memory provides instructions to the processor.

13. The system of claim 12, wherein the hardware processor is further configured to determine a second candidate set of refueling stations from among the first candidate set of refueling stations accessible from the route, present information relating to each refueling station among the second candidate set of refueling stations, and receive a selection of the first refueling station from among the second candidate set of refueling stations.

14. The system of claim 13, wherein the information relating to each refueling station among the second candidate set of refueling stations includes a brand, pricing, and a deviation distance.

15. The system of claim 12, wherein the combination of the fuel price at each respective refueling station among the first candidate set of refueling stations accessible from the route and the corresponding deviation cost for each respective refueling station among the first candidate set of refueling stations accessible from the route includes adding the expected refueling cost at each respective refueling station among the first candidate set of refueling stations accessible from the route and the corresponding deviation cost for each respective refueling station among the first candidate set of refueling stations accessible from the route.

16. The system of claim 12, wherein updating the route to include the first refueling station includes routing from the starting location to the first refueling station and from the first refueling station to the destination location.

17. A computer program product for routing a trip, the computer program product being embodied in a non-transitory computer readable medium and comprising computer instructions for:

determining a route, wherein the route includes a starting location and a destination location;

determining a first candidate set of refueling stations accessible from the route, wherein each of the refueling stations within the first candidate set of refueling stations accessible from the route is less than a first threshold distance of deviation from the route;

determining a fuel price associated with each of the first candidate set of refueling stations;

calculating a deviation cost for each of the first candidate set of refueling stations accessible from the route, wherein the deviation cost is based on a unit distance of deviation from the route for each respective refueling station among the first candidate set of refueling stations accessible from the route;

calculating an imputed cost for each of the first candidate set of refueling stations accessible from the route, wherein the imputed cost is based on a combination of the fuel price at each respective refueling station among the first candidate set of refueling stations accessible from the route and the corresponding deviation cost for each respective refueling station among the first candidate set of refueling stations accessible from the route;

selecting a first refueling station from among the first candidate set of refueling stations, wherein the first refueling station has a minimum imputed cost of any refueling station among the first candidate set of refueling stations accessible from the route;

updating the route to include the first refueling station; and presenting information relating to the updated route.

18. The computer program product of claim 17, further comprising computer instructions for determining a second candidate set of refueling stations from among the first candidate set of refueling stations accessible from the route, presenting information relating to each refueling station among the second candidate set of refueling stations, and receiving a selection of the first refueling station from among the second candidate set of refueling stations.

19. The computer program product of claim 17, wherein the combination of the fuel price at each respective refueling station among the first candidate set of refueling stations accessible from the route and the corresponding deviation cost for each respective refueling station among the first candidate set of refueling stations accessible from the route includes adding the expected refueling cost at each respective refueling station among the first candidate set of refueling stations accessible from the route and the corresponding deviation cost for each respective refueling station among the first candidate set of refueling stations accessible from the route.

20. The computer program product of claim 17, wherein updating the route to include the first refueling station includes routing from the starting location to the first refueling station and from the first refueling station to the destination location.

* * * * *